United States Patent [19]

Burbank

[11] Patent Number: 5,690,191
[45] Date of Patent: Nov. 25, 1997

[54] WHEELBARROW BRAKING SYSTEM

[76] Inventor: Daniel P. Burbank, P.O. Box 227 Ben Berry Rd., Moultonborough, N.H. 03254

[21] Appl. No.: 689,592

[22] Filed: Aug. 12, 1996

[51] Int. Cl.⁶ ........................................... B62B 1/18
[52] U.S. Cl. ................. 188/2 D; 188/2 R; 188/26; 188/71.1; 188/73.46; 188/17; 280/47.31
[58] Field of Search ................. 188/2 D, 2 R, 188/17, 18 A, 21, 19, 22, 73.46, 26, 71.1, 18 R, 20, 9, 23, 24.11, 72.9, 72.1; 280/47.31, 47.32, 47.34, 47.3, 47.33

[56] References Cited

U.S. PATENT DOCUMENTS

| | | | |
|---|---|---|---|
| 2,716,031 | 8/1955 | Roessler | 280/47.31 |
| 3,096,853 | 7/1963 | Farrand | 188/18 A |
| 3,950,005 | 4/1976 | Patterson | 188/29 |
| 4,252,334 | 2/1981 | Filkins | 280/47.26 |
| 4,479,658 | 10/1984 | Michaux | 188/2 D |
| 4,640,520 | 2/1987 | Wing et al. | 188/2 D |
| 4,767,128 | 8/1988 | Terhune | 188/19 |
| 4,962,833 | 10/1990 | McCurdy | 188/21 |
| 5,393,081 | 2/1995 | Mortenson | 188/22 |
| 5,584,491 | 12/1996 | Kronyak, Jr. | 188/2 D |

*Primary Examiner*—Douglas C. Butler

[57] ABSTRACT

A new wheelbarrow braking system for facilitating braking of a conventional wheelbarrow while transporting heavy loads thereby retaining the desired position of the wheelbarrow on uneven surfaces and reducing velocity when transporting down hill. The inventive device includes at least one brake disc secured to the inside surface of a support member of a conventional wheel barrow near the tire rim, and an ergonomic handle support member of a conventional wheel barrow near the tire rim, and an ergonomic handle connected to a brake cable secured to the opposite end of the support member and mechanically connected to the brake disc.

6 Claims, 3 Drawing Sheets

WHEELBARROW BRAKING SYSTEM

BACKGROUND OF THE INVENTION

1. Field of the Invention

The present invention relates to wheelbarrow devices and more particularly pertains to a new wheelbarrow braking system for facilitating braking of a conventional wheelbarrow while transporting heavy loads thereby retaining the desired position of said wheelbarrow on uneven surfaces and reducing velocity when transporting down hill.

2. Description of the Prior Art

The use of wheelbarrow devices is known in the prior art. More specifically, wheelbarrow devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art wheelbarrow devices include U.S. Pat. No. 4,962,833; U.S. Pat. No. 4,640,520; U.S. Pat. No. 4,479,658; U.S. Pat. No. 5,433,464; U.S. Design Patent No. 303,512 and U.S. Pat. No. 5,390,943.

While these devices fulfill their respective, particular objectives and requirements, the aforementioned patents do not disclose a new wheelbarrow braking system. The inventive device includes a braking means secured to the inside surface of a support member of a conventional wheel barrow near the tire rim, and a hand brake means secured to the opposite end of said support member and mechanically connected to said braking means by a brake cable.

In these respects, the wheelbarrow braking system according to the present invention substantially departs from the conventional concepts and designs of the prior art, and in so doing provides an apparatus primarily developed for the purpose of facilitating braking of a conventional wheelbarrow while transporting heavy loads thereby retaining the desired position of said wheelbarrow on uneven surfaces and reducing velocity when transporting down hill.

SUMMARY OF THE INVENTION

In view of the foregoing disadvantages inherent in the known types of wheelbarrow devices now present in the prior art, the present invention provides a new wheelbarrow braking system construction wherein the same can be utilized for facilitating braking of a conventional wheelbarrow while transporting heavy loads thereby retaining the desired position of said wheelbarrow on uneven surfaces and reducing velocity when transporting down hill.

The general purpose of the present invention, which will be described subsequently in greater detail, is to provide a new wheelbarrow braking system apparatus and method which has many of the advantages of the wheelbarrow devices mentioned heretofore and many novel features that result in a new wheelbarrow braking system which is not anticipated, rendered obvious, suggested, or even implied by any of the prior art wheelbarrow devices, either alone or in any combination thereof.

To attain this, the present invention generally comprises a braking means secured to the inside surface of a support member of a conventional wheel barrow near the tire rim, and a hand brake means secured to the opposite end of said support member and mechanically connected to said braking means by a brake cable.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wheelbarrow braking system apparatus and method which has many of the advantages of the wheelbarrow devices mentioned heretofore and many novel features that result in a new wheelbarrow braking system which is not anticipated, rendered obvious, suggested, or even implied by any of the prior art wheelbarrow devices, either alone or in any combination thereof.

It is another object of the present invention to provide a new wheelbarrow braking system which may be easily and efficiently manufactured and marketed.

It is a further object of the present invention to provide a new wheelbarrow braking system which is of a durable and reliable construction.

An even further object of the present invention is to provide a new wheelbarrow braking system which is susceptible of a low cost of manufacture with regard to both materials and labor, and which accordingly is then susceptible of low prices of sale to the consuming public, thereby making such wheelbarrow braking system economically available to the buying public.

Still yet another object of the present invention is to provide a new wheelbarrow braking system which provides in the apparatuses and methods of the prior art some of the advantages thereof, while simultaneously overcoming some of the disadvantages normally associated therewith.

Still another object of the present invention is to provide a new wheelbarrow braking system for facilitating braking of a conventional wheelbarrow while transporting heavy loads thereby retaining the desired position of said wheelbarrow on uneven surfaces and reducing velocity when transporting down hill.

Yet another object of the present invention is to provide a new wheelbarrow braking system which includes a braking means secured to the inside surface of a support member of a conventional wheel barrow near the tire rim, and a hand brake means secured to the opposite end of said support member and mechanically connected to said braking means by a brake cable.

Still yet another object of the present invention is to provide a new wheelbarrow braking system that avoids unnecessary spills by reducing the velocity of the conventional wheelbarrow.

Even still another object of the present invention is to provide a new wheelbarrow braking system that decreases the velocity of the conventional wheelbarrow increasing the user's control.

Another object of the present invention is to provide a new wheelbarrow braking system that allows the user to release the load without having to prevent movement of the wheelbarrow wheel by holding his foot against the wheel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
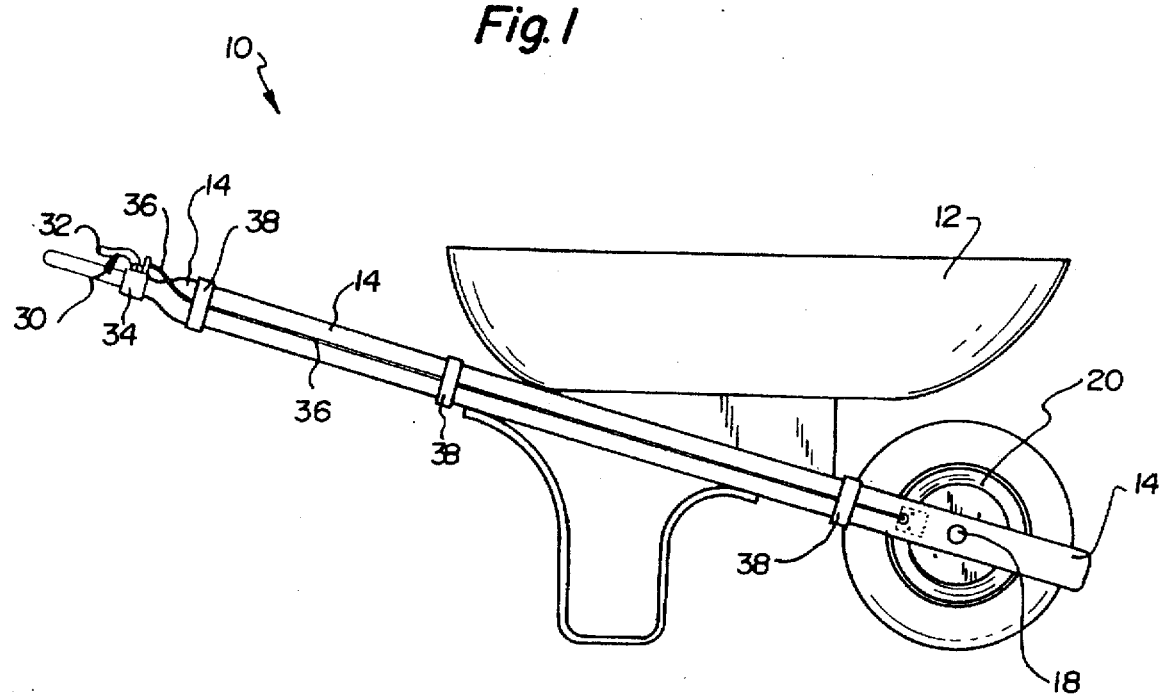
FIG. 1 is a right side view of a new wheelbarrow braking system secured to a conventional wheelbarrow according to the present invention.
Figure 2:
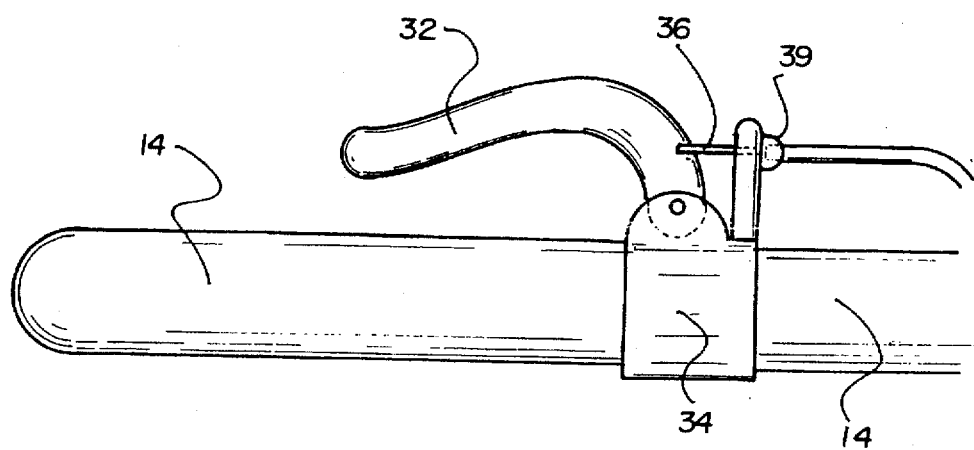
FIG. 2 is a magnified view of the ergonomic handle.

With reference now to the drawings, and in particular to FIGS. 1 through 6 thereof, a new wheelbarrow braking system embodying the principles and concepts of the present invention and generally designated by the reference numeral 10 will be described.

More specifically, it will be noted that the wheelbarrow braking system 10 comprises a braking means 20 secured near the end of a support member 14 near a tire rim of a conventional wheelbarrow 12, a hand brake means 30 secured to the support member 14 opposite of the braking means 20, and a brake cable 36 secured at one end to the hand brake means 30 projecting along the support member 14 attached to said support member 14 by a plurality of cable securing straps 38, and the opposite end secured to the braking means 20 thereby mechanically connecting the hand brake means 30 to the braking means 20 allowing control thereof.

Figure 3:
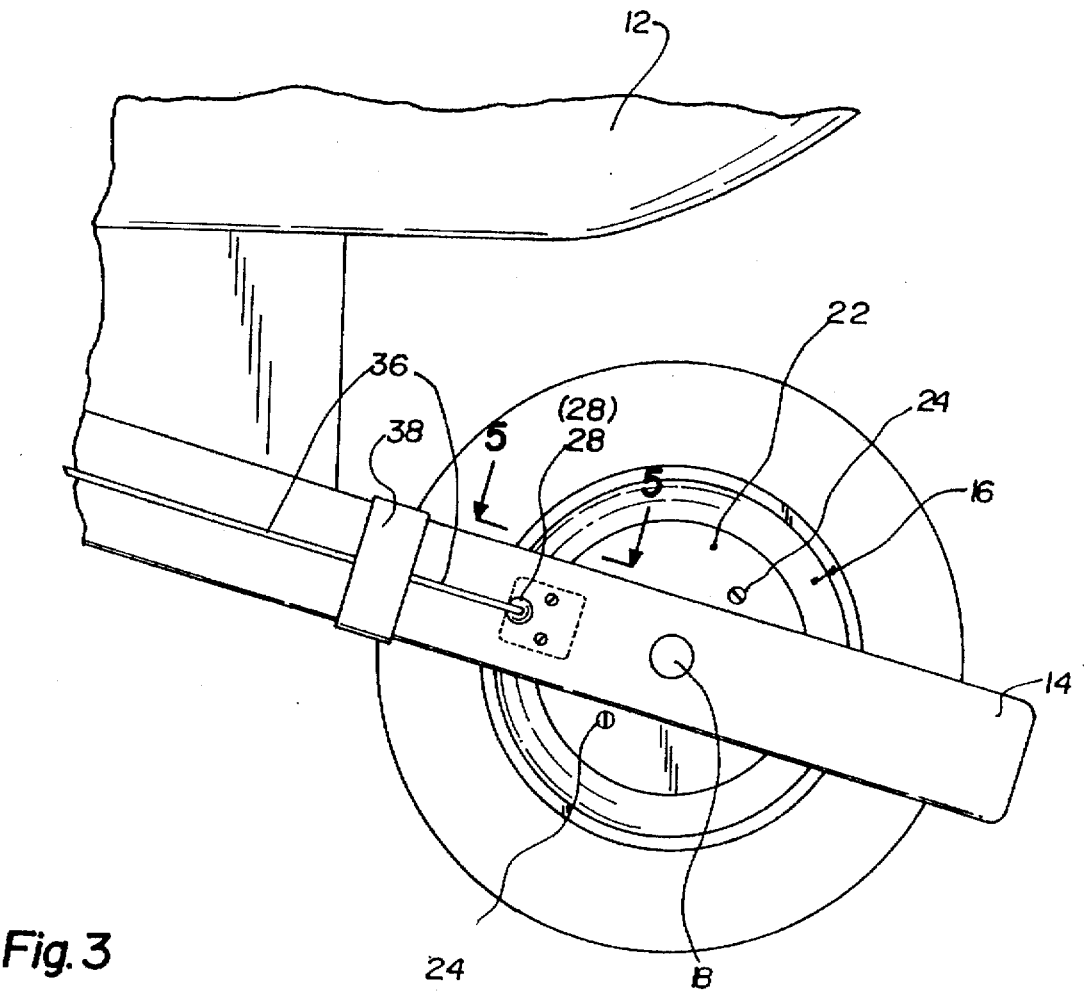
FIG. 3 is a magnified side view of the braking means secured to the conventional wheelbarrow.
Figure 4:
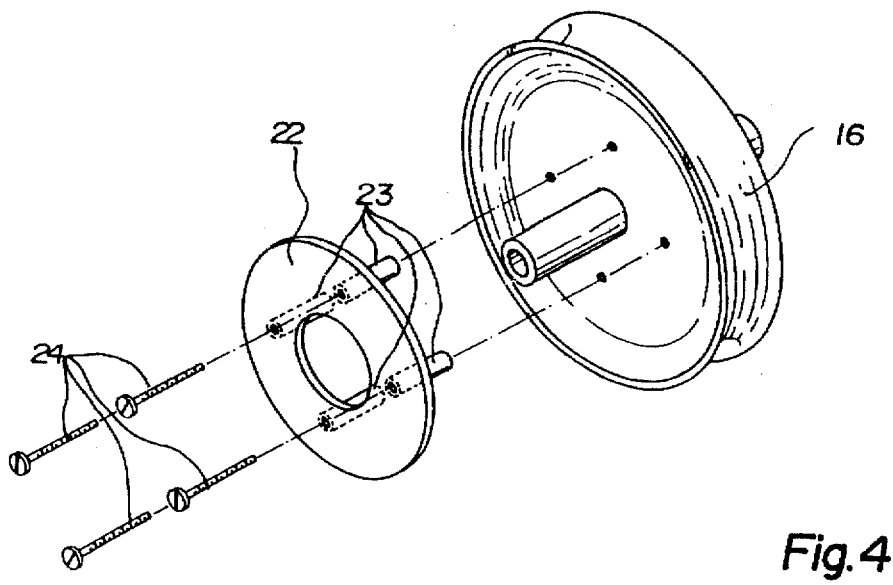
FIG. 4 is an exploded isometric view of the brake disc in relation to the tire rim of the conventional wheelbarrow.
Figure 5:
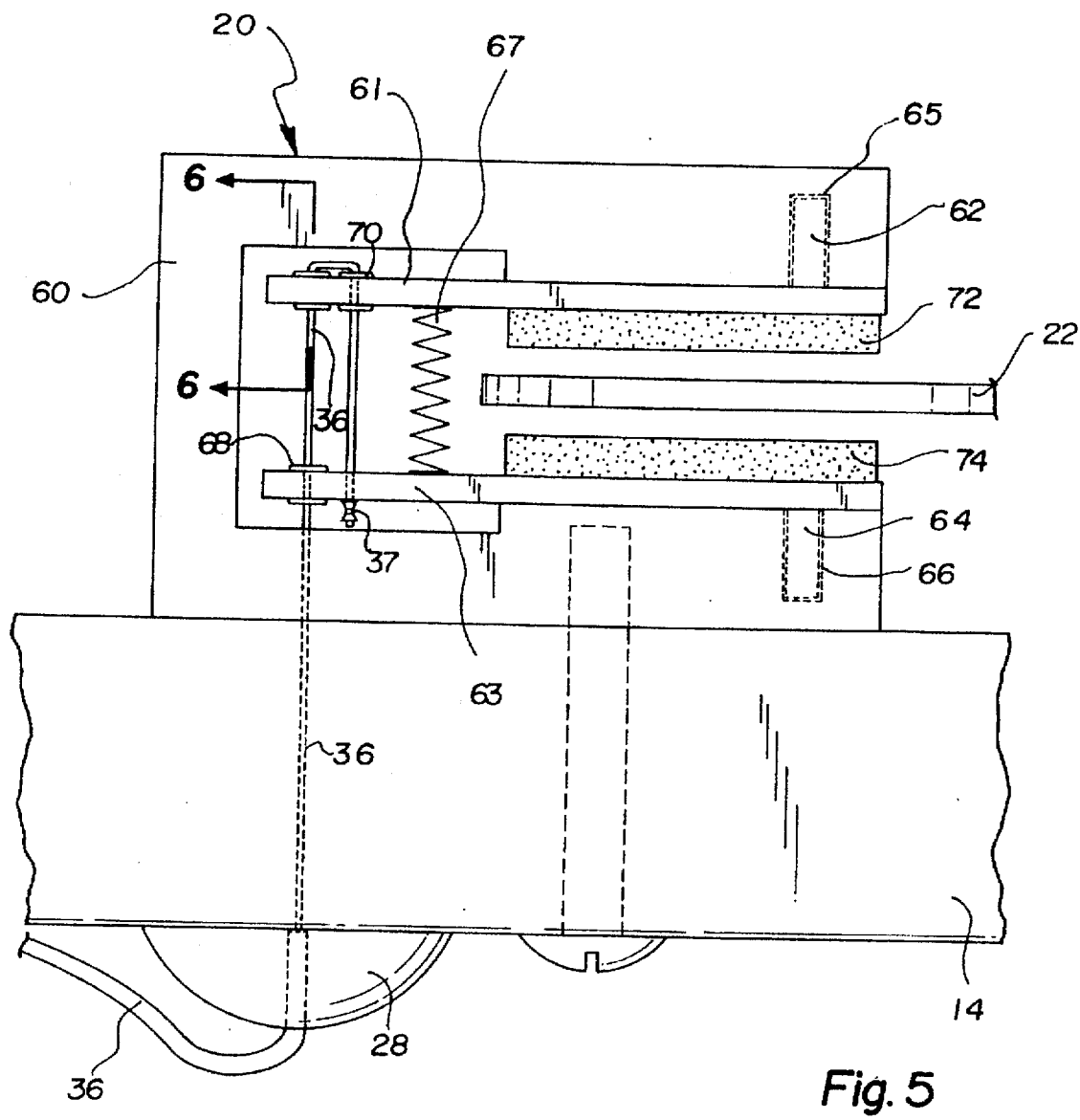
FIG. 5 is a cross sectional view taken along line 5—5 of FIG. 3 displaying the U-shaped caliper support.
Figure 6:
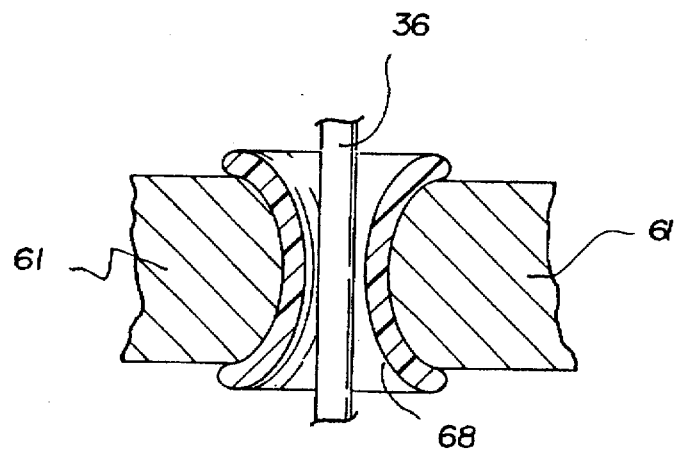
FIG. 6 is a cross sectional view taken along line 6—6 of FIG. 5 disclosing the brake cable slidably positioned within an arcuate nylon bushing.

As best illustrated in FIGS. 3 through 5, it can be shown that the braking means 20 includes a brake disc 22 with a smaller outside diameter than the tire rim 16. Four disc spacers 23 are secured radially to the brake disc 22. Four fasteners 24 project into the brake disc 22 then through the corresponding disc spacers 23 then terminating into the tire rim thereby securing the brake disc 22 to the tire rim positioned a finite distance away. The hand brake means 30 includes a U-clamp support member 34 secured around the support member 14 opposite of the braking means 20. An ergonomic handle 32 is pivotally secured to the U-clamp support member 34. A first cable terminating end 39 is secured to the U-clamp support member 34 and aligning the brake cable 36. The brake cable 36 slidably projects through the first cable terminating end 39 and engages the ergonomic handle 32 near the pivoting point with the U-clamp support member 34. The braking means 20 includes a U-shaped caliper support 60 secured to the inside surface of the support member 14 where the brake disc 22 rotatably projects into the open end of the U-shaped caliper support 60. The U-shaped caliper support 60 includes a second aligning passage 66 projecting orthogonally to the longitudinal axis of the U-shaped caliper support 60 into the open end side adjacent to the support member 14 and a first aligning passage 65 opposite of the second aligning passage 66. A second support member 63 has an orthogonal second aligning shaft 64 near one end. The second aligning shaft 64 slidably projects into the second aligning passage 66. A first support member 61 has an orthogonal first aligning shaft 62 near one end. The first aligning shaft 62 slidably projects into the first aligning passage 65. A compression spring 67 is mesial and engaging the first support member 61 and the second support member 63 positioned at the opposite end of the first aligning shaft 62 and the second aligning shaft 64 separating the support members 61 and 63. A first brake pad 72 is secured to the first support member 61 near the end securing the first aligning shaft 62 on the opposite side. A second brake pad 74 is secured to the second support member 63 near the end securing the second aligning shaft 64 on the opposite side. The second support member 63 includes a second arcuate nylon bushing 68 near the end opposite of the second aligning shaft 64. The first support member 61 includes a first arcuate nylon bushing 69 near the end opposite of the first aligning shaft 62 and includes a third arcuate nylon bushing 71 near the first arcuate nylon bushing 69 as best shown in FIG. 3 of the drawings. The end of the brake cable 36 opposite of the braking means 20 projects into a second cable terminating end 28 secured to the support member 14 near the U-shaped caliper support 60. The brake cable 36 further projects through the support member 14, then through the U-shaped caliper support 60 opposite of the second aligning shaft 64. The brake cable 36 then projects through the second arcuate nylon bushing 68, then through the first arcuate nylon bushing 69, then projects parallel to outside surface of the first support member 61 to the third arcuate nylon bushing 71. The brake cable 36 then projects orthogonally to the first support member 61 projecting through the second support member 63 and terminating into a keeper 37 on the opposite side of the second support member 63.

In use, the user grasps the ergonomic handle 32 and contracts their hand thereby pivoting the ergonomic handle 32 which manipulates the brake cable 36. The brake cable 36 slidably engaged to the first support member 61 and terminating into the second support member 63 slidably withdraws through the arcuate nylon bushings 68, 69, and 71. The support members 61 and 63 are forced towards one another whereby each frictionally engages the brake disc 22 on opposite sides thereby preventing the rotation of the tire rim 16 of the conventional wheelbarrow 12. The compression spring 67 is compressed simultaneously storing energy to separate said support members 61 and 63 apart. The user may then release the ergonomic handle 32 whereby the compression spring 67 forces the support members 61 and 63 apart.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A wheelbarrow braking system comprising:

a braking means secured near an end of a support member near a tire rim of a wheelbarrow:

a hand brake means secured to the support member opposite of the braking means;

a brake cable secured at one end to the hand brake means projecting along the support member attached to said support member by a plurality of cable securing straps, and an opposite end secured to the braking means thereby mechanically connecting the hand brake means to the braking means allowing control thereof; and wherein the braking means includes:

a brake disc with a smaller outside diameter than the tire rim;

four disc spacers secured radially to the brake disc; and four fasteners projecting into the brake disc then through the corresponding disc spacers then terminating into the tire rim thereby securing the brake disc to the tire rim positioned a finite distance away.

2. The wheelbarrow braking system of claim 1, wherein the hand brake means includes:

a U-clamp support member secured around the support member opposite of the braking means;

an ergonomic handle pivotally secured to the U-clamp support member;

a first cable terminating end secured to the U-clamp support member and aligning the brake cable; and the brake cable slidably projecting through the first cable terminating end and engaging the ergonomic handle near the pivoting point with the U-clamp support member.

3. The wheelbarrow braking system of claim 2, wherein the braking means includes:

a U-shaped caliper support secured to the inside surface of the support member where the brake disc rotatably projects into the open end of the U-shaped caliper support, and where the U-shaped caliper support includes a second aligning passage projecting orthogonally to the longitudinal axis of the U-shaped caliper support into the open end side adjacent to the support member and a first aligning passage opposite of the second aligning passage;

a second support member including an orthogonal second aligning shaft near one end, where the second aligning shaft slidably projects into the second aligning passage;

a first support member including an orthogonal first aligning shaft near one end, where the first aligning shaft slidably projects into the first aligning passage;

a compression spring mesial and engaging the first support member and the second support member positioned at the opposite end of the first aligning shaft and the second aligning shaft;

a first brake pad secured to the first support member near the end securing the first aligning shaft on the opposite side, where the first brake pad frictionally engages the brake disc; and a second brake pad secured to the second support member near the end securing the second aligning shaft on the opposite side, where the second brake pad frictionally engages the brake disc on the opposite side of the first brake pad simultaneously.

4. The wheelbarrow braking system of claim 3, wherein the second support member includes a second arcuate nylon bushing near the end opposite of the second aligning shaft.

5. The wheelbarrow braking system of claim 4, wherein the first support member includes a first arcuate nylon bushing near the end opposite of the first aligning shaft and includes a third arcuate nylon bushing near the first arcuate nylon bushing.

6. The wheelbarrow braking system of claim 5, wherein the end of the brake cable opposite of the braking means projects into a second cable terminating end secured to the support member near the U-shaped caliper support, further projecting through the support member, then through the U-shaped caliper support opposite of the second aligning shaft then through the second arcuate nylon bushing, then through the first arcuate nylon bushing, then projecting parallel to outside surface of the first support member to the third arcuate nylon bushing, then projecting orthogonally to the first support member projecting through the second support member and terminating into a keeper on the opposite side of the second support member.

* * * * *